United States Patent
Akutsu et al.

(10) Patent No.: US 7,294,292 B2
(45) Date of Patent: *Nov. 13, 2007

(54) PROCESS FOR PRODUCING POLYMER OPTICAL WAVEGUIDE AND RESIN INJECTING DEVICE

(75) Inventors: Eiichi Akutsu, Ashigarakami-gun (JP); Shigemi Ohtsu, Ashigarakami-gun (JP); Keishi Shimizu, Ashigarakami-gun (JP); Kazutoshi Yatsuda, Ashigarakami-gun (JP)

(73) Assignee: Fuji Xerox Co. Ltd., Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 10/390,685

(22) Filed: Mar. 19, 2003

(65) Prior Publication Data

US 2004/0081416 A1    Apr. 29, 2004

(30) Foreign Application Priority Data

Oct. 24, 2002    (JP)    ............................. 2002-309586

(51) Int. Cl.
*B29D 11/00*    (2006.01)

(52) U.S. Cl. ...................... 264/1.24; 264/1.38; 264/2.5

(58) Field of Classification Search ............... 264/1.24, 264/1.36, 1.39, 1.7, 2.5; 425/808
See application file for complete search history.

(56) References Cited

U.S. PATENT DOCUMENTS

| | | | |
|---|---|---|---|
| 6,355,198 B1 | 3/2002 | Kim et al. | .................... 264/259 |
| 6,500,603 B1 * | 12/2002 | Shioda | ........................ 430/321 |

2005/0133943 A1    6/2005    Akutsu et al.

FOREIGN PATENT DOCUMENTS

| | | |
|---|---|---|
| JP | A-02-155704 | 6/1990 |
| JP | A-06-114845 | 4/1994 |
| JP | A-06-304933 | 11/1994 |
| JP | 8-507800 | 8/1996 |
| JP | A-09-269429 | 10/1997 |

(Continued)

OTHER PUBLICATIONS

George M. Whitesides and J. Christopher Love, "The Art of Building Small", Scientific American, Sep. 2001, pp. 39-47.

B. Michel et al., "Printing meets lithography: Soft approaches to high-resolution patterning", IBM J. Res. & Dev., vol. 45 No. 5, Sep. 2001, pp. 697-719.

(Continued)

*Primary Examiner*—Mathieu D. Vargot
(74) *Attorney, Agent, or Firm*—Oliff & Berridge, PLC (57) ABSTRACT

The present invention provides a process for producing a polymer optical waveguide, comprising the steps of: preparing a mold comprising a concave portion; bringing a substrate into contact with the mold, filling the concave portion with a core-forming curable resin; curing the core-forming curable resin in the concave portion; removing the mold from the substrate; and forming a clad layer on the substrate; wherein the mold comprises a cured resin layer and a reinforcing member, the cured resin layer has the concave portion, the reinforcing member has an introduction portion which communicates with the concave portion and an injection inlet which communicates with the introduction portion, and a discharge portion which communicates with the concave portion is provided in the reinforcing member, the cured resin layer and/or a space between the cured resin layer and the reinforcing member, and a resin injecting device which is used in the process.

23 Claims, 8 Drawing Sheets

FOREIGN PATENT DOCUMENTS

| | | |
|---|---|---|
| JP | A-10-090532 | 4/1998 |
| JP | A-10-130323 | 5/1998 |
| JP | A-11-003545 | 1/1999 |
| JP | 2000-039530 | 2/2000 |
| JP | 2000-039531 | 2/2000 |
| JP | 2000-235127 | 8/2000 |
| JP | 3151364 | 1/2001 |
| JP | A-2001-027714 | 1/2001 |
| JP | A-2001-269958 | 10/2001 |
| JP | A-2002-086462 | 3/2002 |
| JP | A-2002-086515 | 3/2002 |
| JP | A-2002-088120 | 3/2002 |
| JP | A-2002-090565 | 3/2002 |
| JP | A-2002-284812 | 10/2002 |
| JP | 2004-029507 | 1/2004 |
| JP | 2004-86144 | 3/2004 |

OTHER PUBLICATIONS

YounanXia and George M. Whitesides, "Soft Lithography", Annu. Rev. Mater. Sci. 1998, 28:153-84.

Xiao-Mei Zhao et al., "Fabrication of Single-Mode Polymeric Waveguides Using Micromolding in Capuillaries", *Advanced Materials*, vol. 8, No. 5, pp. 420-424, May, 1996.

R. Hsu et al., "Formation of Micro-Sized Cycloolefin Copolymer from Toluene Solution Using Compressed HFC-134a As Antisolvent", Applied Polymer Science, vol. 84, No. 9, pp. 1657-1668.

Y. Wada, "Function & Materials", vol. 20, No. 8, pp. 16-22, Aug. 2000).

H. Shinohara, "Chemistry & Economy", vol. 44, No. 14, pp. 74-82 (Dec. 1997).

Y. Wada, "Function & Materials", vol. 13, No. 1, pp. 40-52 (Jan. 1993).

* cited by examiner

PROCESS FOR PRODUCING POLYMER OPTICAL WAVEGUIDE AND RESIN INJECTING DEVICE

BACKGROUND OF THE INVENTION

1. Field of the Invention

The present invention relates to a process for producing an optical waveguide, in particular, a flexible polymer optical waveguide, and to a resin injecting device.

2. Description of the Related Art

As a process for producing a polymer optical waveguide, the following processes are suggested: (1) a process of impregnating a film with a monomer, selectively exposing a core portion to light to change a refraction index thereof, and sticking a film thereto (selective polymerization); (2) a process of applying a core layer and a clad layer to a substrate, and forming a clad portion by reactive ion etching (RIE); (3) a process using photolithography, in which an ultraviolet ray-curable resin obtained by adding a photosensitive material to a polymer is imagewise exposed to light and developed (direct exposure); (4) an injection molding process and; (5) a process of applying a core layer and a clad layer to a substrate, and exposing a core portion to light to change a refraction index of the core portion (photo bleaching).

However, the selective polymerization process (1) has a problem with regard to the sticking of the film, and the processes (2) and (3) result in an increase in costs since photolithography is used. The process (4) has a problem with regard to precision of the resultant core diameter, and the process (5) cannot provide a sufficient refraction index difference between the core layer and the clad layer.

At present, practical processes which have superior performance include only the processes (2) and (3). However, these processes also have a problem with regard to costs as described above. Additionally, none of the processes (1) to (5) can be applied to the formation of a polymer optical waveguide on a flexible plastic substrate having a large area.

A process of filling a pattern substrate (clad) in which a pattern of grooves, which are to serve capillaries, is formed with a polymer precursor material for a core, curing the precursor material to form a core layer, and then bonding a flat substrate (clad) onto the core layer is known as a process for producing a polymer optical waveguide. However, in this process, not only the capillary grooves but also the entirety of the narrow space between the pattern substrate and the flat substrate is filled with the polymer precursor material, and, when the polymer precursor material is cured, a thin layer having the same composition as the core layer is formed between the pattern substrate and the flat substrate. Therefore, light leaks out through this thin layer.

As one method of solving this problem, David Heard suggests a method of fixing a pattern substrate in which a pattern of grooves, which are to serve as capillaries, is formed to a flat substrate with a clamping member, sealing a contacting portion between the pattern substrate and the flat substrate with a resin, and then reducing an internal pressure to fill the capillaries with a monomer (diallyl isophthalate) solution, thereby producing a polymer optical waveguide (Japanese Patent Gazette No. 3151364).

This method uses the monomer as the core forming resin material instead of using a polymer precursor material to reduce a viscosity of the filling material and fill the capillaries with the filling material using capillarity, so that no other space than the capillaries is filled with the monomer. However, because of the use of the monomer as the core forming material in this method, a volume shrinkage ratio of the monomer is large when the monomer is polymerized. Consequently, transmission loss of the polymer optical waveguide becomes large.

This method is also a complicated method, in which the pattern substrate and the flat substrate are fixed to each other with the clamp, and the contacting portion is sealed with the resin. Thus, this method is not suitable for mass production. As a result, a reduction in costs cannot be expected. Moreover, this method cannot be applied to the production of a polymer optical waveguide using, as a clad, a film having a thickness on the order of several millimeters or a thickness of 1 mm or less.

Recently, George M. Whitesides et al. at Harvard University have suggested, as a method for forming a nanostructure and as a soft lithographic process, a method called capillary micromolding. This is a method of using photolithography to form a master substrate, making use of adhesiveness of polydimethylsiloxane (PDMS) and an easily-peelable property thereof to transfer the nanostructure of the master substrate onto a mold made of PDMS, pouring a liquid polymer into this mold by capillarity, and curing the polymer. A detailed description thereof appears in SCIENTIFIC AMERICAN September 2001 (Nikkei Science, 2001, December).

Moreover, a patent for the capillary micromolding method was granted to Kim Enoch et al. of George M. Whitesides' group at Harvard University (U.S. Pat. No. 6,355,198).

However, even if the production process described in this patent is applied to the production of a polymer optical waveguide, it takes much time to form a core portion thereof since a sectional area of the core portion of the optical waveguide is small. Thus, the process is unsuitable for mass production. This process also has a drawback in that when a monomer solution is polymerized, a volume change is caused, so that a shape of the core is also changed, and consequently transmission loss becomes large.

B. Michel et al. of IBM Zurich Laboratory suggest a lithographic technique exhibiting a high resolution by the use of PDMS, and report that this technique provides a resolution on the order of several tens of nanometers. A detailed description thereof appears in IBM J. REV. & DEV. VOL. 45 NO. 5 Sep. 2001.

As described above, the soft lithographic technique using PDMS and the capillary micromolding method are techniques which have been recently drawing attention as nanotechnologies, primarily in the U.S.A, but elsewhere as well.

However, when an optical waveguide is formed by a micromolding method as described above, reduction of the volume shrinkage ratio of a polymer (so that transmission loss is reduced) when the polymer is cured is incompatible with reduction of the viscosity of a filling liquid (the monomer and so forth) in order to attain easy filling. Accordingly, in a case where reduction of transmission loss is preferentially considered, the viscosity of the filling liquid cannot be lowered sufficiently and a filling speed becomes slow. Thus, the mass production of optical waveguides by this method cannot be expected. The micromolding method is carried out on the assumption that a glass or silicon plate is used as a substrate. Thus, use of a flexible film substrate in this method has not been considered in this method.

SUMMARY OF THE INVENTION

In light of the above-mentioned problems, the present invention has been completed. An object thereof is to provide a process for producing a polymer optical waveguide in which the shape of a core thereof is kept at a high precision level to reduce loss of guided waves, with a high productivity, in a simple manner. Moreover, the another object of the invention is to provide a resin injecting device which can be used in the above-described process.

The objects are attained by providing the following process for producing a polymer optical waveguide and resin injecting device.

A first aspect of the invention provides a process for producing a polymer optical waveguide, comprising the steps of: preparing a mold comprising a concave portion for forming a core; bringing a cladding substrate into close contact with the mold, filling the concave portion of the mold with a core-forming curable resin; curing the core-forming curable resin in the concave portion to form a core on the cladding substrate; removing the mold from the cladding substrate on which the core has been formed; and forming a clad layer on a core-formed surface of the cladding substrate; wherein the mold comprises a cured mold-forming resin layer and a reinforcing member for reinforcing the cured mold-forming resin layer, the cured mold-forming resin layer has the concave portion, the reinforcing member has an introduction portion which communicates with the concave portion and an injection inlet for injecting the core-forming curable resin into the mold which injection inlet communicates with the introduction portion, and a discharge portion which communicates with the concave portion is provided in at least one of the reinforcing member and the cured mold-forming resin layer and a space between the cured mold-forming resin layer and the reinforcing member.

The above-mentioned mold is used in the process for producing a polymer optical waveguide of the invention. Therefore, even if the core-forming curable resin is injected into the concave portion in the mold under pressure, the mold does not deform or the mold and the cladding substrate are not shifted from predetermined positions thereof. As a result, the filling speed can be increased without sacrificing the precision of the core shape. Thus, according to the production process of the invention, a polymer optical waveguide wherein the shape of a core thereof is kept at a high precision level to reduce loss of guided waves can be produced with a high productivity in a simple manner.

A second aspect of the invention provides a resin injecting device for producing a polymer optical waveguide which device is used with a mold having a concave portion for forming a core and an injection inlet which communicates with the concave portion, the device comprising: a holding member for holding a cladding substrate thereon; and a resin injecting path for injecting a core-forming curable resin from the injection inlet into the mold.

BRIEF DESCRIPTION OF THE DRAWINGS

FIGS. 5A to 5C illustrate a step of forming a mold in the invention, and the mold.

FIGS. 6A and 6B illustrate a state that a mold used in the invention is brought into close contact with a cladding substrate with fixing screws.

FIGS. 7A and 7B illustrate a state that a cladding substrate is held on a holing member and brought into close contact with a mold.

FIGS. 8A and 8B illustrate another embodiment in which a cladding substrate is brought into close contact with a mold.

DETAILED DESCRIPTION OF THE PREFERRED EMBODIMENTS

The process for producing a polymer optical waveguide of the present invention is a process for producing a polymer optical waveguide, comprising the steps of: preparing a mold comprising a concave portion for forming a core; bringing a cladding substrate into close contact with the mold, filling the concave portion of the mold with a core-forming curable resin; curing the core-forming curable resin in the concave portion to form a core on the cladding substrate; removing the mold from the cladding substrate on which the core has been formed; and forming a clad layer on a core-formed surface of the cladding substrate; wherein the mold comprises a cured mold-forming resin layer and a reinforcing member for reinforcing the cured mold-forming resin layer, the cured mold-forming resin layer has the concave portion, the reinforcing member has an introduction portion which communicates with the concave portion and an injection inlet for injecting the core-forming curable resin into the mold which injection inlet communicates with the introduction portion, and a discharge portion which communicates with the concave portion is provided in at least one of the reinforcing member and the cured mold-forming resin layer and a space between the cured mold-forming resin layer and the reinforcing member.

The mold used in the invention has two parts: 1) a cured mold-forming resin layer which has a concave portion as described above; and 2) a reinforcing member for reinforcing the cured resin layer which reinforcing member has an introduction portion which communicates with the concave portion and an injection inlet for injecting the core-forming curable resin into the mold which injection inlet communicates with the introduction portion. Such a single injection inlet or a plurality of injection inlets may be provided. A uniform pressured state can be formed inside the mold by providing at least two injection inlets. Moreover, a discharge portion is provided in the mold and is preferably provided in the reinforcing member and/or in the space between the reinforcing member and the cured mold-forming curable resin layer.

Since the above-mentioned mold is used in the process for producing a polymer optical waveguide of the invention, the mold does not deform or the mold and the cladding substrate are not shifted from predetermined positions thereof even if the pressure applied when the resin is injected into the concave portion of the mold is increased. For this reason, the filling speed can be increased without sacrificing the precision of the core shape. Thus, according to the production process of the invention, a polymer optical waveguide in which the core has been formed precisely and which exhibits only a small loss of guided waves can be produced with a high productivity in a simple way.

Firstly, an outline of the process for producing a polymer optical waveguide according to the invention will be described.

Figure 1A:
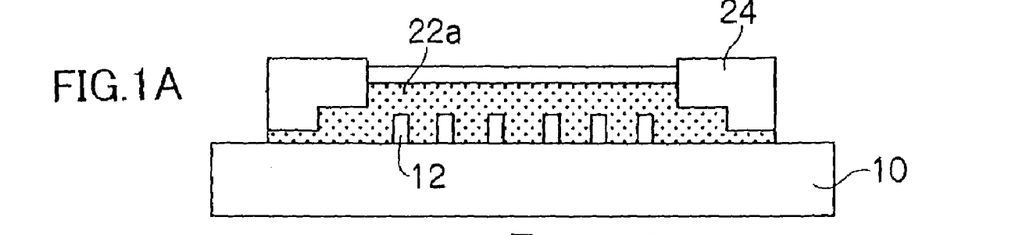
FIGS. 1A to 1F are sectional views showing steps of a process for producing a polymer optical waveguide of the present invention.

FIG. 1A is a sectional view illustrating the state that a mold-forming curable resin layer 22a is formed on a master template 10 in which convex portions 12 for an optical waveguide are formed and that a reinforcing member 24 is put on the resin layer 22a while pressing the reinforcing member 24 against the resin layer 22a. At this time, the mold-forming curable resin has not been cured.

Figure 1B:
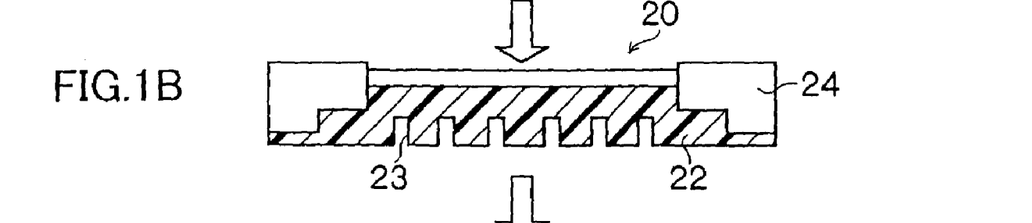

Next, in this state, the mold-forming curable resin layer 22a is cured. As a result, the mold-forming curable resin turns a cured resin layer 22 and the layer 22 is integrated with the reinforcing member 24. The resultant mold 20 is separated from the master template 10 (see FIG. 1B). The mold 20 has concave portions 23 corresponding to the convex portions 12, at least one introduction portion (not shown) which communicates with one end of each of the concave portions 23, and at least one discharge portion which communicates with the other end of each of the concave portions 23.

Figures 1C, 1D:
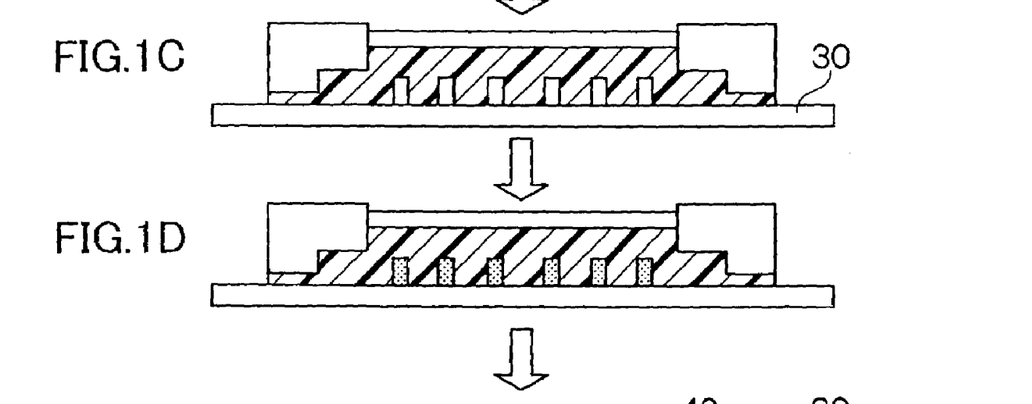

A cladding substrate 30 is brought into close contact with the thus-formed mold 20 (see FIG. 1C). Next, a core-forming curable resin is injected under pressure from injection inlet formed in the reinforcing member 24 of the mold through the introduction portion to the concave portions of the cured resin layer 22 and discharged from the discharge portion. FIG. 1D illustrates a state that the concave portions of the cured resin layer 22 are filled with the curable resin and subsequently the resin in the concave portions is cured.

Figure 1E:
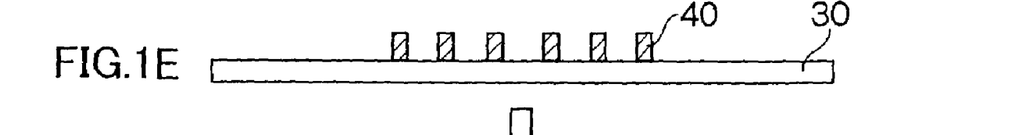

Next, the mold 20 is removed. As a result, cores 40 have been formed on the cladding substrate 30, as illustrated in FIG. 1E.

Figure 1F:
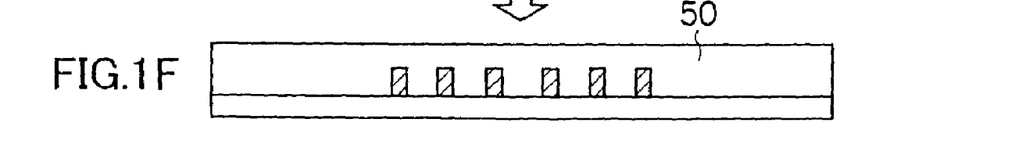

Furthermore, a clad layer 50 is formed on the core-formed surface of the cladding substrate, thereby producing a polymer optical waveguide 60 (see FIG. 1F).

Hereinafter, the invention will be described in more detail in the order of steps thereof.

1) Step of Preparing a Mold

<Formation of a Master Template>

In order to produce a master template in which at least one convex portion for an optical waveguide (i.e., a convex portion corresponding to a core) is formed, a conventional method, such as RIE, or a mechanical working exhibiting a high plane precision can be used without especial restraint. In the case where it is unnecessary to change the thickness of the optical waveguide convex portion, the convex portion can easily be formed by a photolithography of applying a thick film resist (SU-8) to a substrate by spin-coating and then exposing the resist to light. An electro-deposition and a process for producing a polymer optical waveguide by photoelectro-deposition (Japanese Patent Application No. 2002-10240 and so on), which were filed by the present Applicant, can also be applied to the formation of the master template. The size of the polymer optical waveguide convex portion formed in the master template is appropriately decided according to the use of the polymer optical waveguides or the like and is generally from about 30 to 200 µm. For example, in the case of optical waveguides for a single mode, a core having a size of about 10 µm square is generally used. In the case of optical waveguides for a multimode, cores having a size of from about 50 to 100 µm square are generally used. However, optical waveguides having a core portion having a size of several hundreds of micrometers may also be used according to their use.

<Formation of a Mold>

Figure 2A:
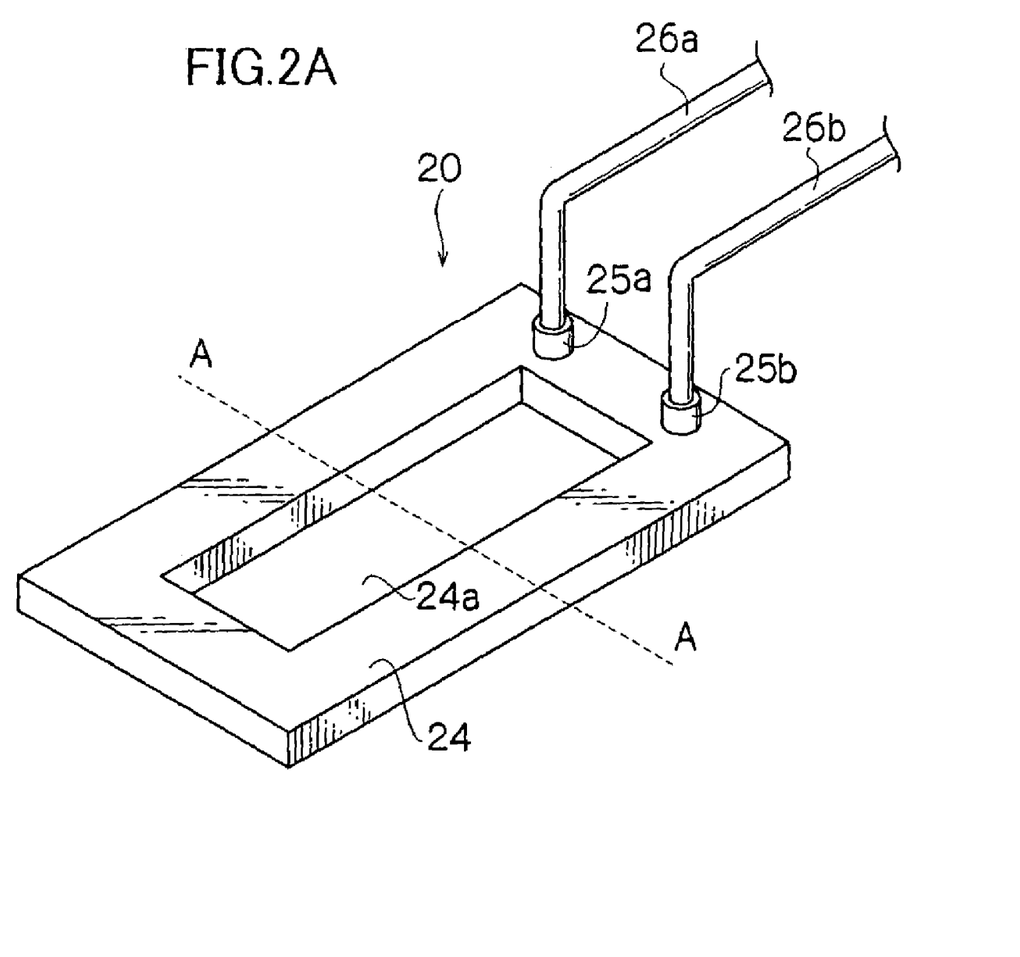
FIG. 2A is a perspective view of an example of the mold used in the invention and FIG. 2B is a sectional view thereof taken from A-A line in FIG. 2A.
Figure 2B:
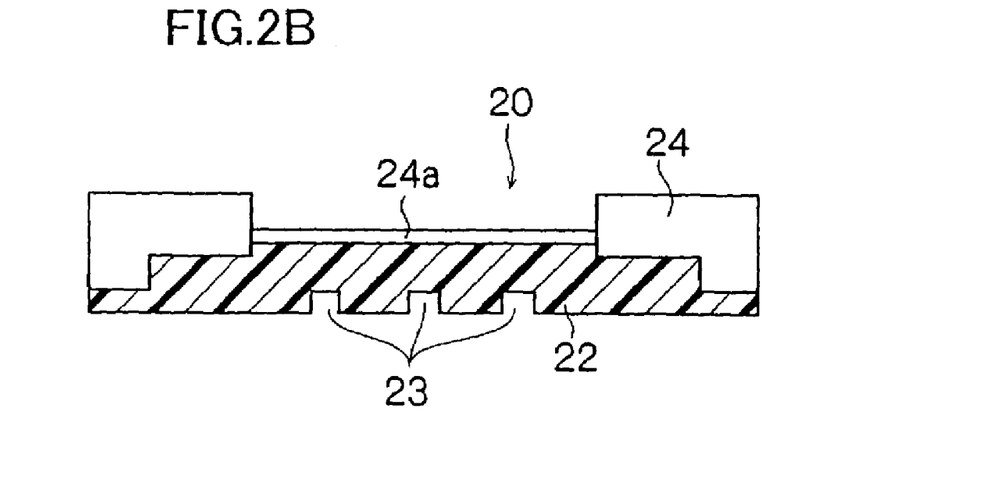

FIGS. 2 illustrate an example of the mold used in the invention. FIG. 2A is a perspective view of the mold, and FIG. 2B is a sectional view of the mold taken from A-A line. Reference numbers 20, 22 and 24 represent the mold, a cured resin layer in which a mold-forming curable resin has been cured, and a reinforcing member for reinforcing the cured resin layer, respectively. The cured resin layer 22 has concave portions 23. The reinforcing member 24 has introduction portions (not shown) and injection inlets 25a and 25b for injecting the core-forming curable resin under pressure which injection inlets communicate with the respective introduction portions. In addition, a space which communicates with one end of each of the concave portions 23 and the introduction portions is formed between the cured resin layer 22 and the reinforcing member 24. Moreover, a discharge portion (not shown) which communicates with the other end of each of the concave portions 23 is provided in the mold 20. Injection pipes 26a and 26b for injecting the core-forming curable resin are connected to the injection inlets 25a and 25b. It is preferable that a plurality of the injection inlets is provided to make pressured states in a portion of the respective concave portions which is in the vicinity of the introduction portions uniform.

In the case where an ultraviolet ray-curable resin is used as the core-forming resin, a portion of the reinforcing member 24 which correspond to the concave portions 23 of the cured resin layer 22 are made of a light-transmissive member 24 (such as a glass plate or a hard plastic plate) and is an opening for light exposure. In the case where a thermosetting resin is used as the core-forming curable resin, it is unnecessary to make this portion light-transmissive.

Figure 3:
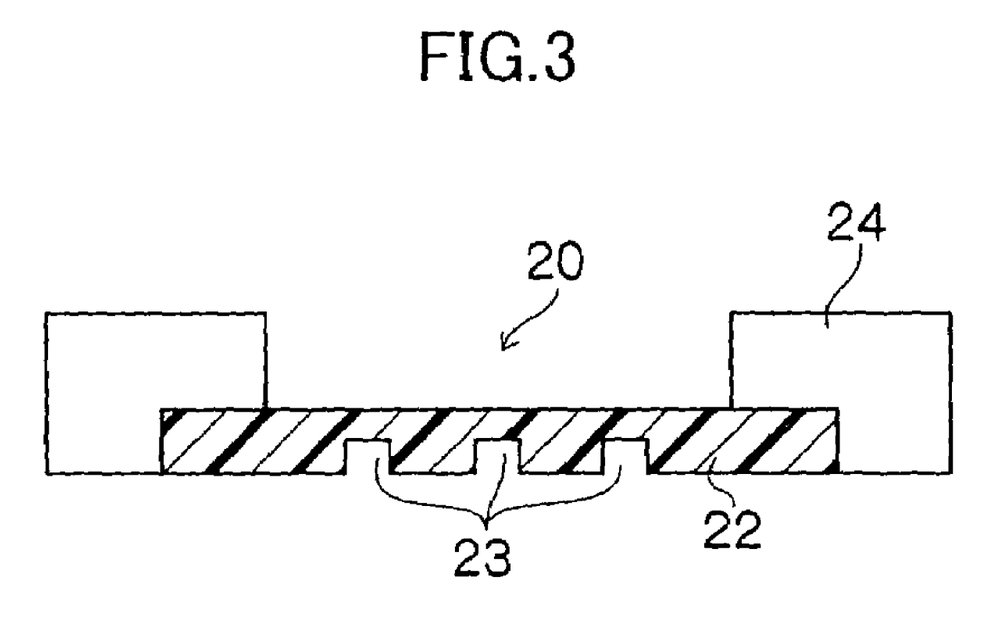
FIG. 3 is a sectional view of another example of the mold used in the invention.

In the case where an ultraviolet ray-curable resin is used as the core-forming curable resin, instead of using the light-transmissive member in the opening for light exposure, the portion of the reinforcing member 24 which corresponds to the concave portions 23 of the cured resin layer 22 may be cut off, as illustrated in FIG. 3.

Figure 4:
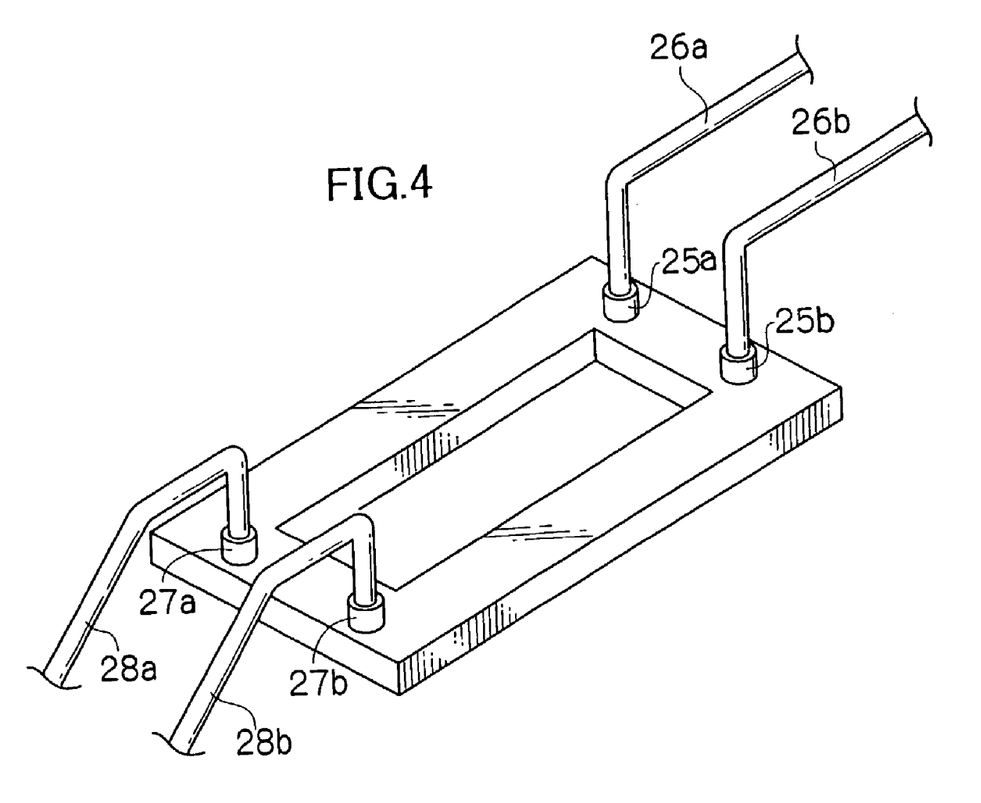
FIG. 4 is a perspective view of a still another example of the mold used in the invention.

As illustrated in FIG. 4, the filling speed can be further increased by providing air outlets 27a and 27b and the discharge portion at the side opposite to the injection inlets 25a and 25b and the introduction portions, and connecting pressure-reducing exhaust pipes 28a and 28b to the air outlets 27a and 27b, and reducing the pressure in the mold. At this time, the precision of the core formation are not deteriorated since the cured resin layer 22 is reinforced by the reinforcing member 24. It is preferable that a plurality of the air outlets is provided to make reduced pressure states in a portion of the respective concave portions which is in the vicinity of the discharge portion uniform.

The thickness of the cured resin layer is preferably from about 10 µm to 30 mm. The reinforcing member is made of metal, ceramic, hard plastic or the like, and the thickness thereof is appropriately from about 1 to 40 mm.

Hereinafter, a preferred example of the mold used in the invention will be described in detail, referring to FIGS. 5A to 5C.

Figure 5A:
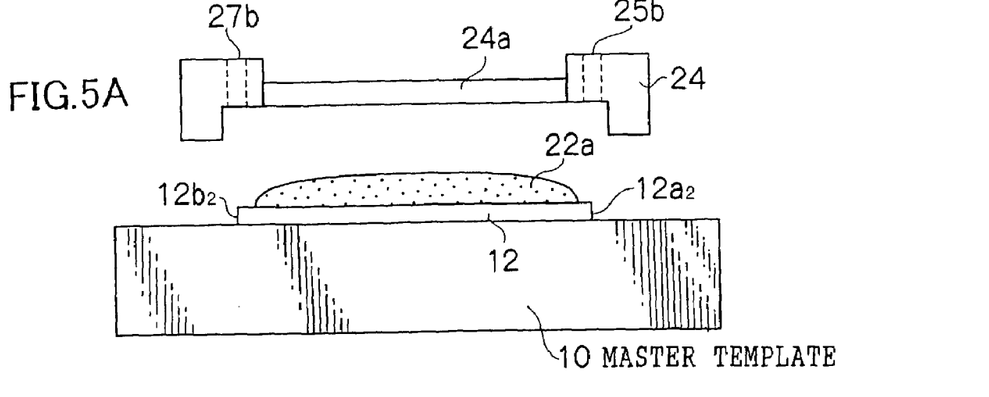
FIG. 5A is a sectional view illustrating a step of forming a mold-forming curable resin layer on a master template.

As illustrated in FIG. 5A, a mold-forming curable resin layer 22a is formed on a master template 10 in which optical waveguide convex portions 12 formed in such a manner that end portions $12a_2$, $12b_2$ of the optical waveguide convex portions 12 are not embedded in the layer 22a. Next, in the state that the mold-forming curable resin layer 22a has not yet been cured, a reinforcing member 24 is put on the resin layer 22a while pressing the reinforcing member 24 against the resin layer 22a. Thereafter, the mold-forming curable resin is cured. FIG. 5B is a plan view illustrating a state after the resin is cured. In FIG. 5B, reference number 10 represents the master template, 12 represents convex portions corresponding to cores, 22 represents the cured resin layer, 24 represents the reinforcing member, 25a and 25b represent injection inlets, and 27a and 27b represent air outlets. The cured resin layer 22 and the reinforcing member 24 are integrated with each other when the mold-forming curable resin is cured. Thereafter, the resultant mold 20 in which the cured resin layer 22 and the reinforcing member 24 have been integrated with each other is taken from the master template 10.

Figure 5B:
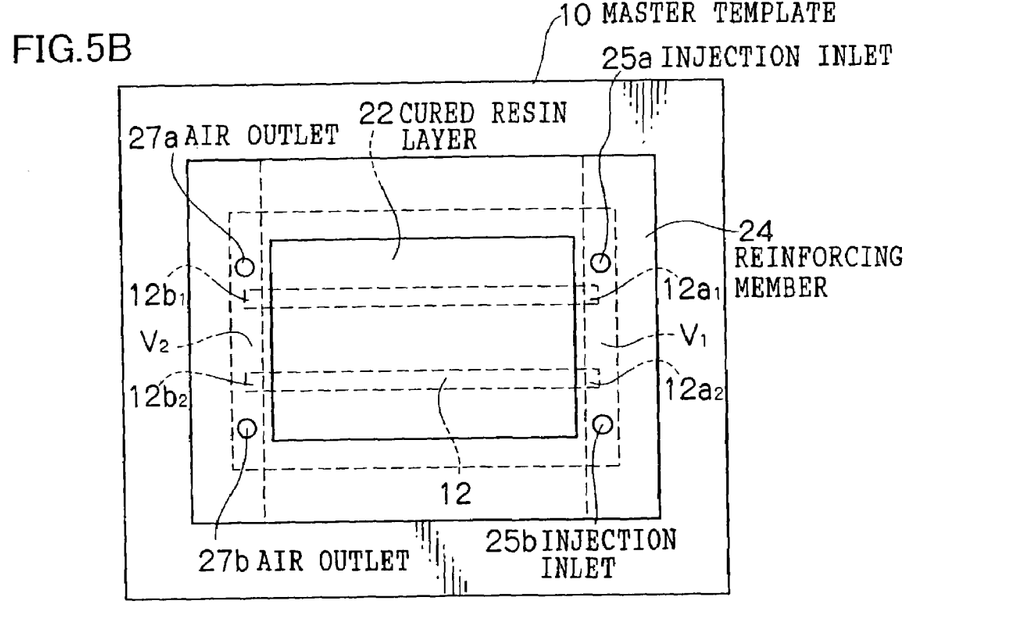
FIG. 5B is a plan view illustrating a state that a reinforcing member is pressed onto the mold-forming curable resin layer and subsequently the resin is cured.
Figure 5C:
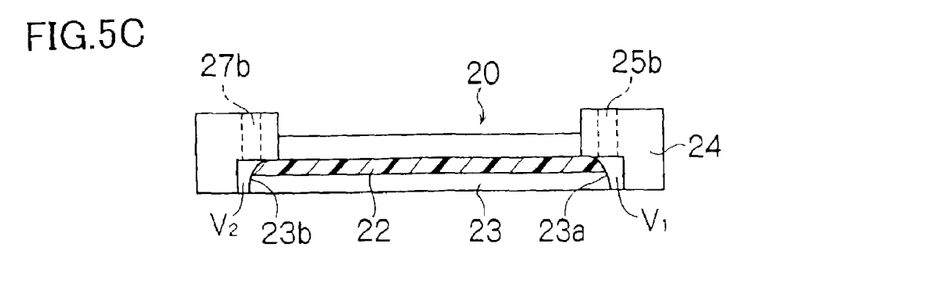
FIG. 5C is a sectional view obtained by cutting the mold in such a manner that a concave portion in the formed mold can be seen.

FIG. 5C is a sectional view obtained by cutting the mold 20 so that the concave portions thereof can be seen. For description, in this figure, the injection inlet 25b, the air outlet 27b and the introduction portions are drawn by imaginary lines. The discharge portion is composed of a space drawn by the imaginary lines and a space $V_2$ which is formed between the cured resin layer 22 and the reinforcing member 24 and which communicates with one end portion 23b of each of the concave portions. The introduction portion communicates with a space $V_1$ which is formed between the cured resin layer 22 and the reinforcing member 24 and which communicates with the other end portion 23a of each of the concave portions 23. A core-forming curable resin is injected from the injection inlet 25b under pressure, passed through the introduction portion 23a and the space $V_1$, fills the concave portion 23, and is discharged from the discharge portion. The pressure of the space $V_2$ inside the mold is reduced through pressure-reducing exhaust pipes which are connected to the respective outlets 27a and 27b.

Therefore, when the mold-forming curable resin layer is formed on the master template in FIG. 5A, it is necessary to consider the positions of the injection inlets 25a and 25b, the introduction portions, the space $V_1$, the air outlets 27a and 27b, and the discharge portion including the space $V_2$ in such a manner that the injection inlets 25a and 25b can communicate with the respective introduction portions and that the introduction portions can communicate with the space $V_1$ and that the air outlets 27a and 27b can communicate with the discharge portion including the space $V_2$.

Since the mold illustrated in FIGS. 5A and 5B has not only the injection inlets for injecting the core-forming curable resin under pressure but also the air outlets for pressure-reduction and exhaust, the filling speed of this resin can be further increased. At this time, in order that the cladding substrate, in particular, the cladding film substrate will not deform, it is preferable to provide at least two injection inlets and at least two air outlets, and make the pressured states in the portion of the concave portions in the vicinity of the introduction portions and the reduced states in the portion of the concave portions in the vicinity of the discharge portion uniform.

<Mold-forming Curable Resin>

The mold-forming curable resin preferably has a nature in which a cured product thereof can easily be separated from the master template and has large mechanical strength and dimensional stability required for molds, which are repeatedly used.

Since the mold-forming curable resin should correspond precisely to the master template having convex portions for forming an optical waveguide, the resin preferably has a low viscosity to some extent, and, for example, it preferably has a viscosity of about 2000 to 7000 mPa·s. A solvent for adjusting the viscosity may be added thereto as far as a bad effect is not produced by the solvent. (Examples of the mold-forming curable resin used in the invention include resins which become rubbery bodies, which have elasticity after being cured, such as curable silicone rubber oligomers.)

A curable silicone rubber oligomer (of a thermosetting type or a room-temperature curing type) is preferably used as the mold-forming curable resin from the viewpoint of separability from the master template, mechanical strength and dimensional stability. A liquid resin having a low molecular weight, among the above-mentioned resins, is preferably used since the resin can have a sufficient permeability. The viscosity of the resin is preferably in the range of 500 to 7,000 mPa·s, and more preferably in the range of 2,000 to 5,000 mPa·s.

A silicone resin having a methylsiloxane group, an ethylsiloxane group or a phenylsiloxane group is preferable as the curable silicone resin. A curable dimethylsiloxane resin is particularly preferable.

It is preferable that the master template is beforehand subjected to a releasing treatment, such as coating with a releasing agent, to promote the separation of the master template from the mold.

The surface energy of the cured resin layer of the mold is preferably in the range of 10 to 30 dyn/cm, and more preferably from 15 to 24 dyn/cm from the viewpoint of the adhesiveness thereof to a cladding substrate.

The Share rubber hardness of the cured resin layer of the mold is preferably in the range of 15 to 80, and more preferably in the range of 20 to 60 from the viewpoint of mold-preparing performance or separability.

The surface roughness (root mean square roughness (RMS)) of the cured resin layer of the mold is preferably 0.5 μm or less, and preferably 0.1 μm or less from mold-preparing performance.

In the case where the core-forming curable resin is an ultraviolet ray-curable resin, it is necessary that the mold, (meaning both the cured resin layer and the opening for light exposure in the reinforcing member which opening corresponds to the concave portions), is light-transmissive. It is preferable that the light transmissivity of these portions of the mold within the wavelength range of 350 to 700 nm is 80% or more.

2) Step of Bringing the Cladding Substrate into Close Contact with the Mold

The cladding substrate used in the invention is not limited and, a glass substrate, a ceramic substrate, a plastic substrate or the like can be used as such. In order to control the refractive index, the above-mentioned substrate coated with a resin may be used. The refractive index of the cladding substrate is preferably less than 1.55, and more preferably less than 1.50. It is necessary that the refractive index thereof is smaller than that of the core material by 0.05 or more.

A polymer optical waveguide using a flexible plastic film substrate can also be used as an optical interconnection between a coupler and a board, an demultiplexer, or the like. The material of the film substrate is selected according to the purpose thereof, considering the refractive index, optical properties such as light transmissivity, mechanical strength, heat resistance, adhesiveness to the mold, the flexibility of the film substrate, or the like. Examples of this film include an alicyclic acryl film, an alicyclic olefin film, a cellulose triacetate film, and a fluorine-containing resin film. The refractive index of the film substrate is preferably less than 1.55, and more preferably less than 1.53 in order to obtain a sufficient difference from the refractive index of the core.

An OZ-1000, OZ-1100 or the like, in which an alicyclic hydrocarbon such as tricyclodecane is introduced into an ester group and which is available from Hitachi Chemical Co., Ltd., is used as the alicyclic acrylic film.

Examples of the alicyclic olefin film include a film made of an olefin having a norbornene structure in the main chain thereof, and a film made of an olefin having a norbornene structure in the main chain thereof and a polar group such as an alkyloxycarbonyl group (an alkyl group thereof has 1 to 6 carbon atoms, or is a cycloalkyl group) in the side chain thereof. A film made of an alicyclic olefin resin having a norbornene structure in the main chain thereof and a polar group such as an alkyloxycarbonyl group in the side chain thereof, as described above, has superior optical properties such as a low refractive index (refractive index: about 1.50, which can provide a sufficient refractive index difference between the core and clad) and a high light transmissivity, and is superior in adhesiveness to the mold and heat resistance. Therefore, this film is particularly suitable for producing a polymer optical waveguide of the invention. In the invention, particularly, a combination of the use of a thermosetting silicone resin (in particular, a thermosetting dimethylsiloxane resin) as the mold-forming material and the use of an alicyclic olefin resin having a norbornene structure in the main chain thereof and an alkyloxycarbonyl group in the side chain thereof as the film substrate has a very strong adhesiveness therebetween. Thus, even if the sectional area of the concave portion is very small (for example, a 10 μm×10 μm square), the curable resin can rapidly fill the concave portion by capillarity.

The thickness of the film substrate is appropriately selected, considering flexibility, rigidity and easiness for the handing thereof, and the like. In general, the thickness is preferably from about 0.1 to 0.5 mm.

In this step, it is preferable to completely bring cladding substrate into close contact with the mold whereby the two are not shifted from predetermined portions thereof at all even if a pressure is applied to one end of the mold or a pressure at the other end thereof is reduced in the next step of injecting a core-forming curable resin. It is therefore preferable to fix the reinforcing member to the cladding substrate with screws, hold the cladding substrate on a holding member, or fix the holding member on which the cladding substrate is held to the reinforcing member of the mold, thereby completely bringing the mold into close contact with the cladding substrate. In particular, when a flexible film is used as the cladding substrate and is not fixed with the above-described means, the surface of the film may be slightly waved at the time of injecting the core-forming curable resin into the space between the mold and the film even if the mold is brought into close contact with the film. Therefore, it is preferable to adopt one of the above-described means.

Figure 6A:
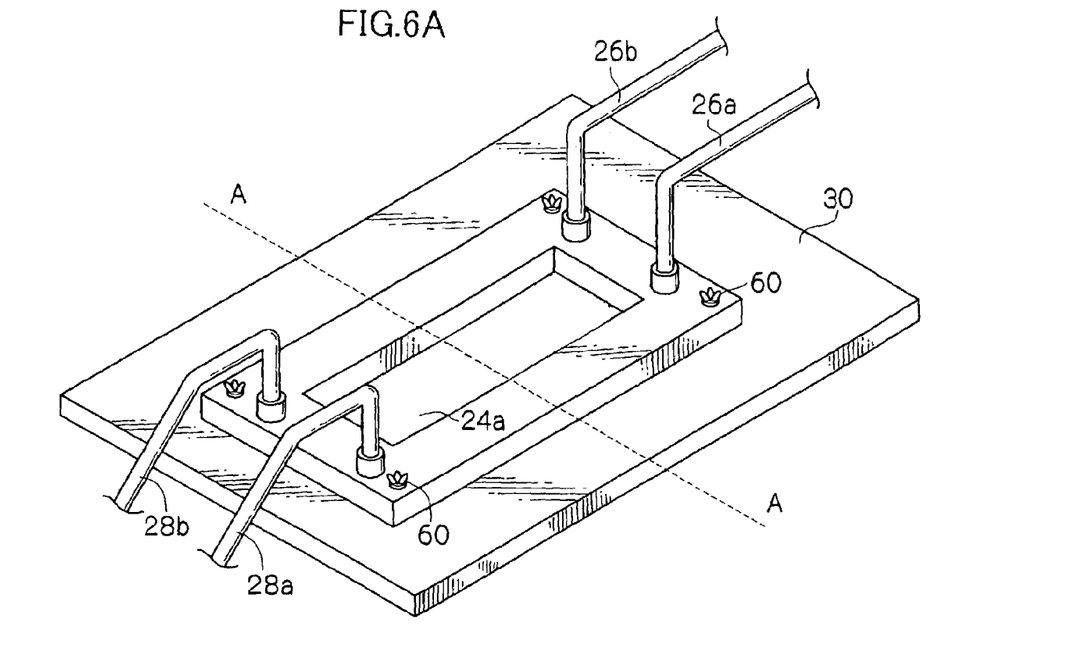
FIG. 6A is a perspective view thereof.
Figure 6B:
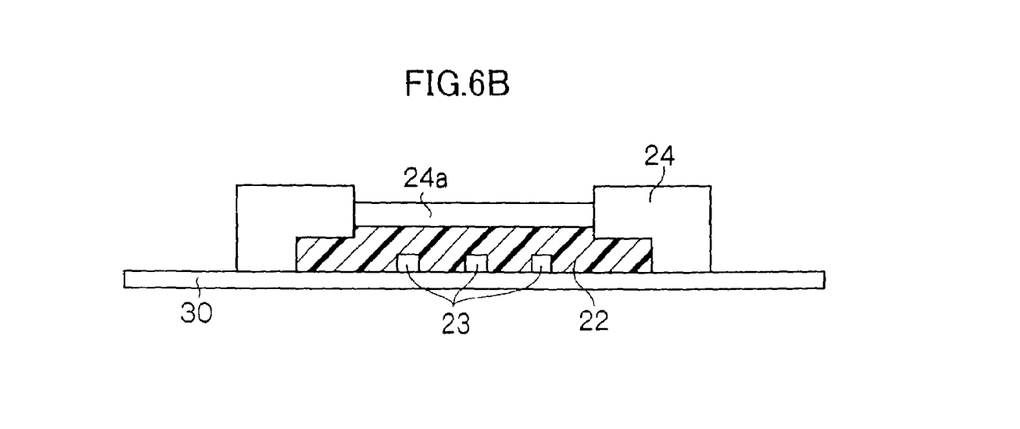
FIG. 6B is a sectional view thereof taken from line A-A in FIG. 6A.

FIG. 6A illustrates an example of four corners of a mold are fixed to a cladding substrate 30 with fixing screws 60, and FIG. 6B is a sectional view thereof taken from line A-A in FIG. 6A.

Figure 7A:
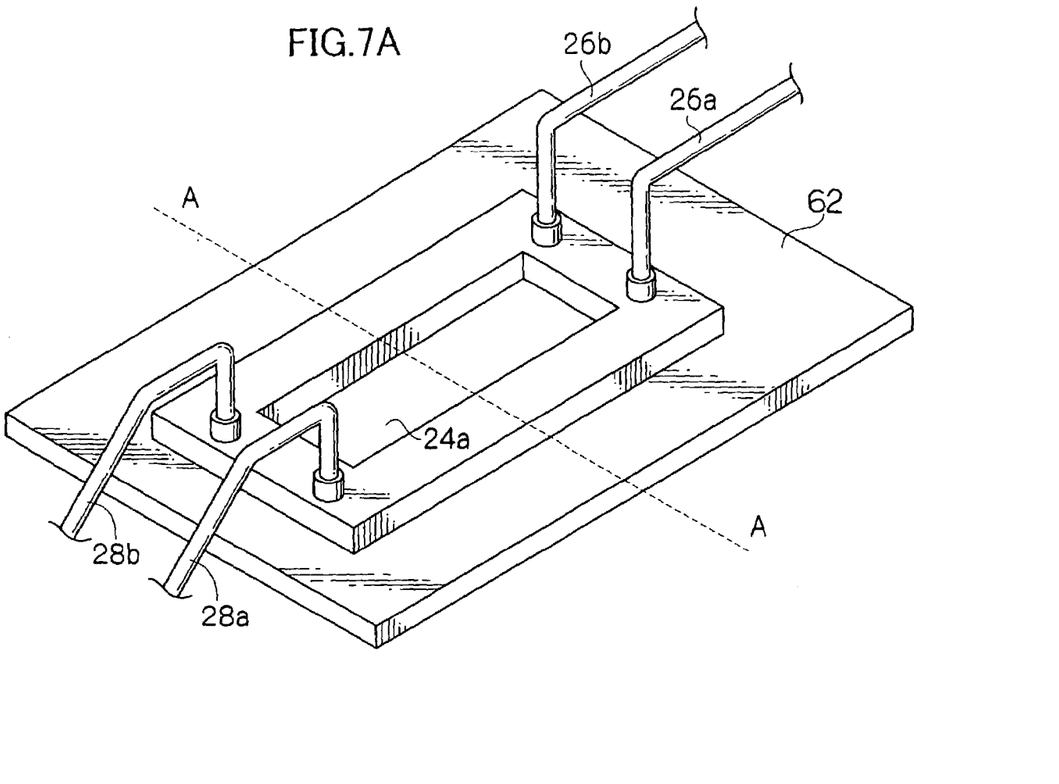
FIG. 7A is a perspective view thereof.
Figure 7B:
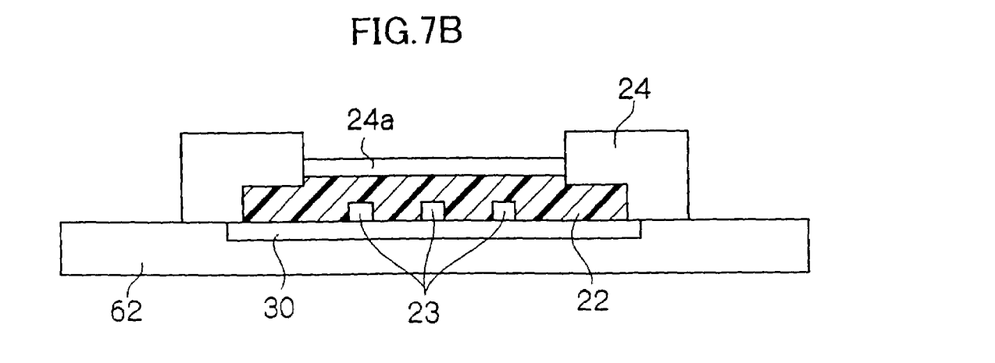
FIG. 7B is a sectional view thereof taken from line A-A in FIG. 7A.

FIG. 7A illustrates an example in which a cladding substrate is held on a holding member 62, and FIG. 7B is a sectional view thereof taken from line A-A in FIG. 7A.

Figure 8A:
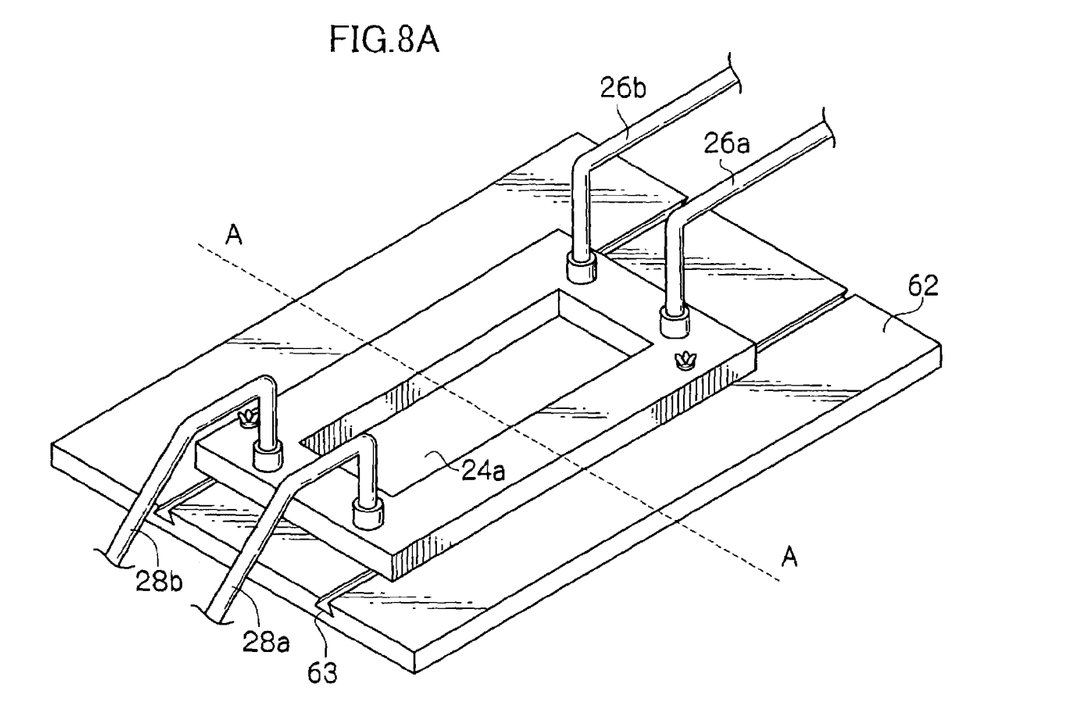
FIG. 8A is a perspective view thereof.
Figure 8B:
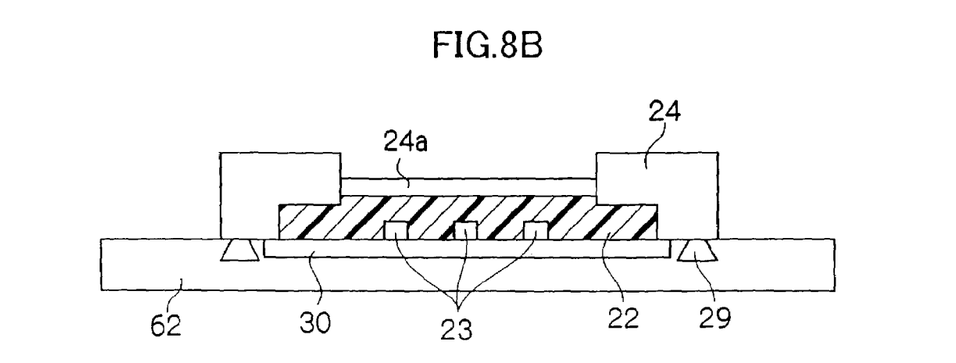
FIG. 8B is a sectional view thereof taken from line A-A in FIG. 8A.

As illustrated in FIGS. 8A and 8B, a method of forming fitting portions 29 and 63 for fixation in the mold 20 and a holding member 62, and then fixing the mold to the holding member by engaging them may be adopted.

3) Step of Filling the Concave Portion of the Mold with a Core-forming Curable Resin This step is preferably conducted by injecting a core-forming curable resin under pressure from an injection inlet of the mold brought into close contact with the cladding substrate.

In this case, the core-forming curable resin such as an ultraviolet ray-curable resin or thermosetting resin is injected from an injection inlet formed in the reinforcing member into the mold, and is injected under pressure from the introduction portion which communicates with one end portion of the concave portion of the cured resin layer through a space $V_1$ in FIG. 5B to the whole of the concave portion, and then discharged from the discharge portion which communicates with the other end portion of the concave portion. If an air outlet is formed in the reinforcing member and a pressure in the portion of the concave portion in the vicinity of the discharge portion is reduced to remove the air from the mold at this time, the filling speed is further improved.

It is necessary that the used core-forming curable resin has a sufficiently low viscosity to easily fill the concave portion and that the refractive index of this resin after being cured is higher than that of the polymer for the clad (by 0.02 or more). Additionally, in order to precisely reproduce the original shape which the optical waveguide convex portion formed on the master template has, it is necessary that a difference between a volume of the core-forming curable resin layer before curing thereof and a volume of the core-forming curable resin layer after curing thereof is small since a reduction in the volume causes, for example, a loss of guided waves. Accordingly, the volume change in the core-forming curable resin is preferably as small as possible, and is preferably 10% or less, and more preferably 6% or less. In the case where a solvent is used to make the viscosity of a liquid containing the core-forming curable resin low, a difference of a volume of the resin layer before curing thereof and a volume of the resin layer after curing thereof becomes large. Thus, the use of a solvent is preferably avoided.

Accordingly, the viscosity of the core-forming curable resin is preferably 10 to 2,000 mPa·s, more preferably 20 to 1,000 mPa·s, and still more preferably 30 to 500 mPa·s.

An epoxy, a polyimide or an acrylic ultraviolet ray-curable resin is preferably used as the core-forming curable resin.

It is necessary that the refractive index of the cured product of the core-forming curable resin is larger than that of the film substrate which are to serve as a clad (and that of a clad layer in the step 6), which will be detailed), and the refractive index of the cured resin is 1.53 or more, and preferably 1.55 or more. The refractive index difference between the core and the clad (including the clad layer in the step 6)) is 0.02 or more, and preferably 0.05 or more.

4) Step of Curing the Core-Forming Curable Resin in the Concave Portion

The ultraviolet ray-curable resin or thermosetting resin is cured in the concave portion. In order to cure the ultraviolet ray-curable resin, an ultraviolet lamp, an ultraviolet LED, a UV radiating device or the like is used. In order to cure the thermosetting resin, heating in an oven or some other manner is utilized.

5) Step of Removing the Mold from the Cladding Substrate

The mold used in the above-mentioned steps 1) to 4) can be also used as the clad layer. When the mold is used as the clad layer, it is unnecessary to remove the mold, and this step is omitted.

6) Step of Forming a Clad Layer on the Core-formed Surface of the Cladding Substrate A clad layer is formed on the cladding substrate on which the core has been formed. Examples of the clad layer include a layer obtained by applying a film (for example, a film substrate used in the step 2) is used in the same manner) to the cladding substrate; a layer obtained by applying a curable resin (an ultraviolet ray-curable resin or thermosetting resin) to the cladding substrate and then curing the applied resin; and a polymeric film obtained by applying a solution in which a polymeric material is dissolved in a solvent to the cladding substrate and then drying the applied layer. In the case where the film is used as the clad layer, the film is bonded to the cladding substrate with an adhesive. At this time, the refractive index of the adhesive is preferably close to that of the film.

In order to obtain a sufficient refractive index difference between the clad layer and the core, the refractive index of the clad layer is preferably less than 1.55, and more preferably less than 1.53. The refractive index of the clad layer is preferably equal to that of the film substrate from the viewpoint of light confinement. From the viewpoint of the effect of suppressing loss of guided light waves, the refractive index difference between the cladding substrate and the clad layer is preferably 0.1 or less.

EXAMPLES

The present invention will be more specifically described hereinafter by way of the following examples, but the invention is not limited to these examples.

Example 1

An ultraviolet curable thick film resist solution (SU-8, made by MicroChem. Corp.) was applied to a Silicon monocrystal substrate by spin-coating, and then the resultant layer was pre-baked in a heating oven at 80° C. The resultant was exposed through a photo mask to light from a high-pressure mercury lamp, and developed, so as to form a substrate having fine convex portions having a square section (width: 50 µm, height: 50 µm, and length: 60 mm). Next, this was post-baked at 120° C. to form a master template for producing optical waveguide cores.

Next, a reinforcing member as illustrated in FIGS. 2A and 2B was formed. An opening 24a for light exposure was made of quartz.

A releasing agent was applied to the master template, and then a thermosetting silicone rubber oligomer (dimethylpolysiloxane SYLGARD 184, made by Dow Corning Asia Ltd.) was applied onto the master template, as illustrated in FIG. 5A. The reinforcing member was pressed onto the silicone rubber oligomer layer, and fixed. Thereafter, the resultant was heated at 120° C. for 30 minutes to integrate the silicone rubber with the reinforcing member. The thickness of the cured silicone rubber layer was 1.2 mm. Next, the resultant mold was separated from the master template. The mold had concave portions having a size of 50 µm in the silicone rubber layer, and an introduction portion and a discharge portion for a core-forming curable resin.

This reinforced silicone rubber mold and an Arton film (made by JSR Corp., refractive index: 1.510) having a thickness of 188 µm were brought into close contact with each other under pressure. An injection pipe for the core-forming curable resin was connected to an injection inlet of the reinforcing member. An ultraviolet ray-curable resin (PJ3001, made by JSR Corp.) having a viscosity of 1300 mPa·s was injected from the injection pipe to the concave portions under pressure. After 1.5 minute, the resin filled the whole of the concave portions. The injection pipe was removed from the mold, and UV light having an intensity of 50 mW/cm$^2$ was radiated through the opening for light exposure of the mold onto the resin for 10 minutes, so as to cure the core-forming curable resin in the concave portions.

The mold was removed, so that cores having a refractive index of 1.591 were formed on the Arton film.

An ultraviolet ray-curable resin (JSR Corp.) whose refractive index after being cured was 1.510, which was the same as that of the Arton film, was applied to the whole of the core-formed surface of the Arton film. Thereafter, UV light having an intensity of 50 mW/cm$^2$ was radiated onto the resin for 10 minutes so as to cure the resin (film thickness of the cured resin: 10 µm). In this way, a flexible polymer optical waveguide was yielded. The loss of this polymer optical waveguide was 0.35 dB/cm.

Example 2

A polymer optical waveguide was produced in the same manner as in Example 1 except that a reinforcing member having injection inlets and air outlets as illustrated in FIG. 4 was used instead of the reinforcing member in Example 1; the internal pressure of the mold (the space $V_2$ in FIG. 5C) was reduced through the pressure-reduction exhaust pipe at the same time when the core-forming curable resin was injected under pressure; an ultraviolet ray-curable resin (made by JSR Corp., refractive index: 1.500) having a viscosity of 500 mPa·s was used as the core-forming curable resin; and the ultraviolet ray-curable resin was cured by UV having an intensity of 75 mW/cm$^2$. The loss of this polymer optical waveguide was 0.41 dB/cm.

Example 3

Using a glass substrate, a master template was formed in the same manner as in Example 1. The same mold as used in Example 2 was formed.

This mold was brought into close contact with an Arton film (made by JSR Corp., refractive index: 1.510) having a thickness of 188 µm. An ultraviolet ray-curable resin (PJ3001, made by JSR Corp.) having a viscosity of 1300 mPa·s, which was a core-forming curable resin, was injected from the injection pipe to concave portions in the mold under pressure. At this time, the pressure in the concave portions was reduced and the air was removed from the other end of the mold. After the ultraviolet ray-curable resin filled the concave portions in the mold, the injection pipe and the pressure-reduction exhaust pipe were removed from the mold and then UV light having an intensity of 50 mW/cm$^2$ was radiated through the opening for light exposure of the mold onto the resin for 10 minutes, so as to cure the resin in the concave portions. The mold was removed, so that cores having a refractive index of 1.591 were formed on the Arton film.

An ultraviolet-ray curable adhesive solution whose refractive index was 1.510, which was the same as that of the Arton film, was applied to a core-formed surface of the Alton film. Thereafter, another Arton film having a thickness of 120 μm was put thereon, and then UV light having an intensity of 50 mW/cm² was radiated onto the adhesive solution for 15 minutes so as to cure the adhesive. In this way, a flexible-film type sandwich polymer optical waveguide was yielded. The loss of this polymer optical waveguide was 0.33 dB/cm.

Example 4

A polymer optical waveguide was formed in the same manner as in Example 2 except that the Arton film as the cladding substrate in Example 2 was held on a holding member as illustrated in FIG. 7. When the core-forming curable resin was injected into the concave portions of the mold under pressure, the cladding substrate was firmly fixed to the mold.

COMPARATIVE EXAMPLE 1

A thick film resist solution (SU-8, made by Microchemical Co., Ltd.) was applied to a Silicon substrate by spin-coating, and then the resultant layer was pre-baked at 80° C. The resultant was exposed through a photo mask to light, and developed so as to form convex portions having a square section (width: 50 μm, height: 50 μm, and length: 150 mm). Next, this was post-baked at 120° C. to form a master template for producing optical waveguide cores.

Next, a releasing agent was applied to this master template, and then a thermosetting silicone rubber oligomer (dimethylpolysiloxane SYLGARD 184, made by Dow Corning Asia Ltd.) was poured onto the master template. The oligomer was heated and cured at 120° C. for 30 minutes and the resultant mold precursor (thickness: 3 mm) having concave portions corresponding to the convex portions having the square section was removed from the master template. Furthermore, both ends of the mold precursor were cut to form input and output portions for an ultraviolet ray-curable resin which will be described below. In this way, a mold was formed.

This mold was brought into close contact with a glass substrate (thickness: 500 μm), which was slightly larger than the mold. Next, several droplets of an ultraviolet ray-curable resin (made by JSR Corp., refractive index: 1.5010) having a viscosity of 3000 mPa·s were dropped onto one of the input and output portions which were at respective ends of the mold. As a result, the ultraviolet ray-curable resin filled the concave portions by capillarity. It took 24 hours to fill the concave portions having a length of 50 mm with the resin. Next, the resin was exposed through the PDMS mold to UV light having an intensity of 50 mW/cm² for 5 minutes, so as to cure the resin. The mold was removed from the Arton film. As a result, cores having the same shape as the convex portions of the master template were formed on the Arton film. The refractive index of the cores was 1.591.

Next, an ultraviolet ray-curable resin (made by JSR Corp.) whose refractive index after being cured was 1.510, which was the same as that of the glass substrate, was applied to the whole of the core-formed surface of the glass substrate. UV light having an intensity of 50 mW/cm² was then radiated onto the resin for 10 minutes, so as to cure the resin (film thickness after the resin was cured: 10 μm). In this way, a polymer optical waveguide was yielded. The loss of this polymer optical waveguide was 1.98 dB/cm.

What is claimed is:

1. A process for producing a polymer optical waveguide, comprising:
   preparing a mold comprising a concave portion for forming a core;
   bringing a cladding substrate into close contact with the mold;
   filling the concave portion of the mold with a core-forming curable resin;
   curing the core-forming curable resin in the concave portion to form a core on the cladding substrate;
   removing the mold from the cladding substrate on which the core has been formed; and
   forming a clad layer on a core-formed surface of the cladding substrate;
   wherein the mold includes a cured mold-forming resin layer and a reinforcing member for reinforcing the cured mold-forming resin layer, the cured mold-forming resin layer having the concave portion, the reinforcing member comprising material different than the mold-forming resin layer and having an introduction portion which communicates with the concave portion, an injection inlet for injecting the core-forming curable resin into the mold, wherein
   a space exists between the cured mold-forming resin layer and the reinforcing member, and
   wherein the mold includes a discharge portion which communicates with the concave portion and is provided in at least one of the reinforcing member and the cured mold-forming resin layer.

2. A process for producing a polymer optical waveguide according to claim 1, wherein the core-forming curable resin is injected into the mold under pressure.

3. A process for producing a polymer optical waveguide according to claim 1, wherein the cured mold-forming resin layer of the mold comprises a cured silicone rubber oligomer.

4. A process for producing a polymer optical waveguide according to claim 1, wherein a thickness of the cured mold-forming resin layer is in a range of 10 to 30 μm.

5. A process for producing a polymer optical waveguide according to claim 1, wherein the reinforcing member comprises a metal or a ceramic.

6. A process for producing a polymer optical waveguide according to claim 1, wherein a thickness of the reinforcing member is in a range of 1 to 40 μm.

7. A process for producing a polymer optical waveguide according to claim 1, wherein the reinforcing member comprises an air outlet which communicates with the discharge portion and the pressure in the concave portion is reduced by exhausting air in the mold from the air outlet.

8. A process for producing a polymer optical waveguide according to claim 1, wherein the core-forming curable resin is a photocurable resin and the reinforcing member has an opening which corresponds to the concave portion.

9. A process for producing a polymer optical waveguide according to claim 8, wherein the opening is made of light-transmissive material or is formed by cutting off a portion of the reinforcing member.

10. A process for producing a polymer optical waveguide according to claim 1, wherein the mold is prepared by forming a mold-forming curable resin layer on a master template, putting the reinforcing member on the mold-forming curable resin layer, curing the mold-forming curable resin layer to integrate the mold-forming curable resin layer with the reinforcing member, and removing the master template.

11. A process for producing a polymer optical waveguide according to claim 1, wherein the cladding substrate is a film substrate.

12. A process for producing a polymer optical waveguide according to claim 11, wherein the film substrate comprises an alicyclic olefin resin.

13. A process for producing a polymer optical waveguide according to claim 1, wherein the cladding substrate is fixed to the reinforcing member of the mold in the step of bringing the cladding substrate into close contact with the mold.

14. A process for producing a polymer optical waveguide according to claim 13, wherein the cladding substrate is placed on a holding member in the step of bringing the cladding substrate into close contact with the mold.

15. A process for producing a polymer optical waveguide according to claim 14, wherein the holding member is fixed to the reinforcing member.

16. A process for producing a polymer optical waveguide according to claim 1, wherein the core-forming curable resin comprises one of an ultraviolet ray-curable resin and a thermosetting resin.

17. A process for producing a polymer optical waveguide according to claim 1, wherein a surface energy of the cured mold-forming resin layer of the mold is in a range of 10 to 30 dyn/cm.

18. A process for producing a polymer optical waveguide according to claim 1, wherein a Shore rubber hardness of the cured mold-forming resin layer of the mold is in a range of 15 to 80.

19. A process for producing a polymer optical waveguide according to claim 1, wherein a surface roughness of the cured mold-forming resin layer is no more than 0.5 µm.

20. A process for producing a polymer optical waveguide according to claim 1, wherein a difference between a volume of the core-forming curable resin layer before curing thereof and a volume of the core-forming curable resin after curing thereof is no more than 10% in the step of curing the core-forming curable resin.

21. A process for producing a polymer optical waveguide, comprising:

preparing a mold comprising a cured mold-forming resin layer and a reinforcing member, the cured-mold forming resin layer including a concave portion configured to form a core, and the reinforcing member being comprised of a material different than the cured mold-forming resin layer and configured to reinforce the cured mold-forming resin layer; the mold further comprising an introduction portion which communicates with the concave portion, an injection inlet for injecting the core-forming curable resin into the mold and a space between the cured mold-forming resin layer and the reinforcing member, bringing a cladding substrate into close contact with the mold;

filling the concave portion of the mold with a core-forming curable resin;

curing the core-forming curable resin in the concave portion to form a core on the cladding substrate;

removing the mold from the cladding substrate on which the core has been formed; and forming a clad layer on a core-formed surface of the cladding substrate.

22. A process for producing a polymer optical waveguide according to claim 21, wherein the core-forming curable resin is pressurized and introduced into the concave portion at the time that the concave portion is filled with the core-forming curable resin.

23. A process for producing a polymer optical waveguide according to claim 21, wherein air in the concave portion is discharged form the discharge portion to reduce the pressure in the concave portion at the time that the concave portion is filled with the core-forming curable resin.

* * * * *